United States Patent

[11] 3,609,728

[72] Inventors Richard M. Quinn;
Jerome A. Kwiatkowski, both of Muncie, Ind.
[21] Appl. No. 792,611
[22] Filed Jan. 21, 1969
[45] Patented Sept. 28, 1971
[73] Assignee Ball Corporation
Muncie, Ind.

[54] PORTABLE REMOTE LOCATION MEASURING SYSTEM UTILIZING PULSE WIDTH MODULATION
16 Claims, 5 Drawing Figs.

[52] U.S. Cl. .................................................. 340/206,
340/347 AD, 73/362, 340/233, 340/228, 325/113, 325/142
[51] Int. Cl. ....................................................... G08c 19/16
[50] Field of Search .......................................... 340/206,
228, 233, 347 AD; 328/3; 73/362; 332/9 T, 15; 325/113, 142

[56] References Cited
UNITED STATES PATENTS

| | | | |
|---|---|---|---|
| 3,231,877 | 1/1966 | Marlot............................ | 340/206 |
| 3,330,970 | 7/1967 | Wennerberg et al. ........ | 307/88.5 |
| 3,333,476 | 8/1967 | Hardy et al. .................. | 73/362 |
| 3,378,828 | 4/1968 | Stark.............................. | 340/206 |
| 3,477,292 | 11/1969 | Thornton ....................... | 73/362 |
| 3,475,742 | 10/1969 | Whitney et al................ | 340/207 |
| 3,492,586 | 1/1970 | Leffmann...................... | 328/3 |

Primary Examiner—John W. Caldwell
Assistant Examiner—Robert J. Mooney
Attorney—Campbell, Harris & O'Rourke ABSTRACT: A portable system for measuring a condition, particularly temperature, and transmitting a signal indicative of the condition to a remote location. A portable insulating and protective dry container adapted for use in extreme temperature environments, such as occasioned within a furnace or oven, houses a small transmitter. The transmitter is connected to a bridge-type transducer responsive to the condition to produce a pulse width modulated output signal that is transmitted to a remote receiving and monitoring location.

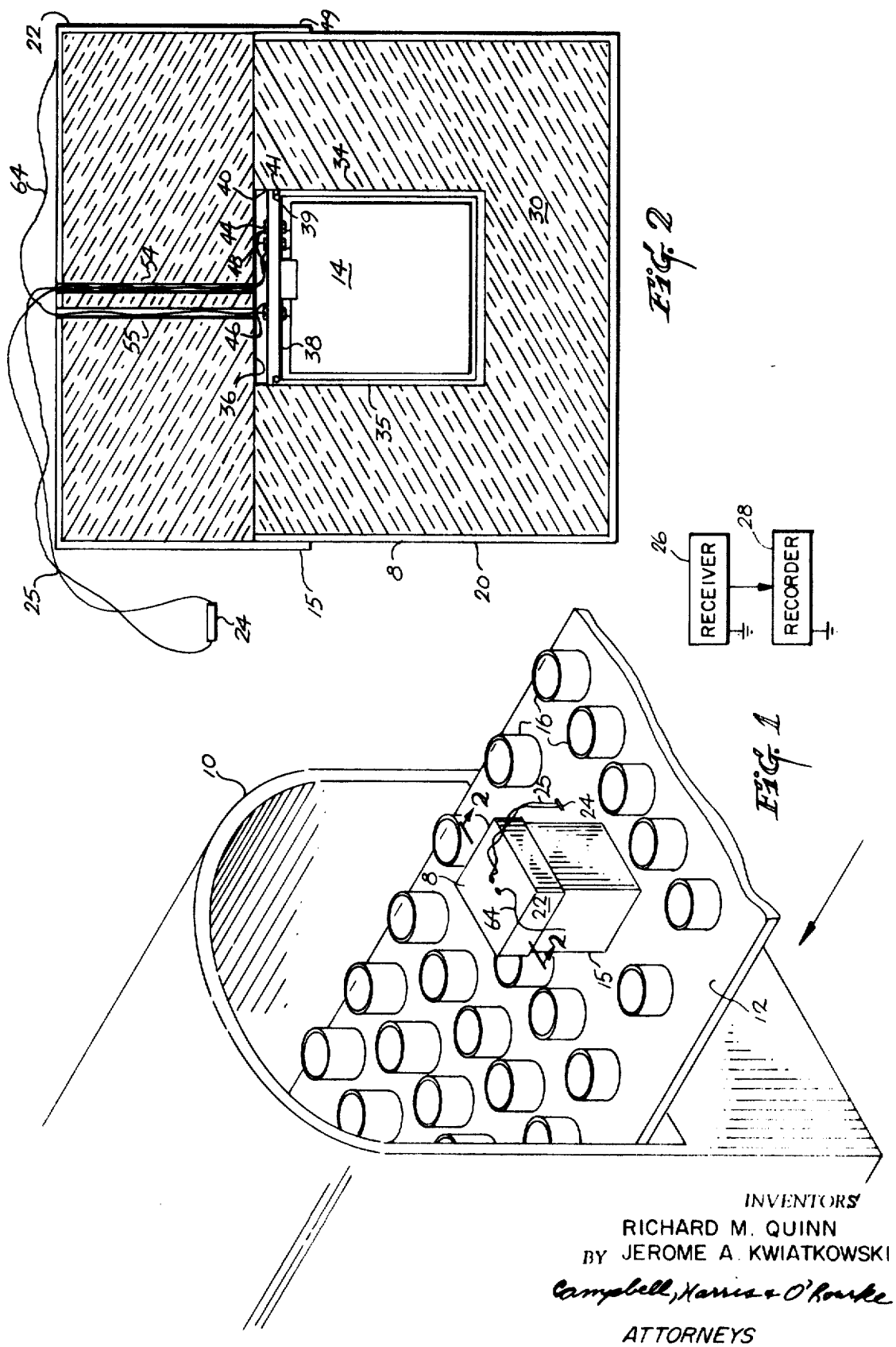

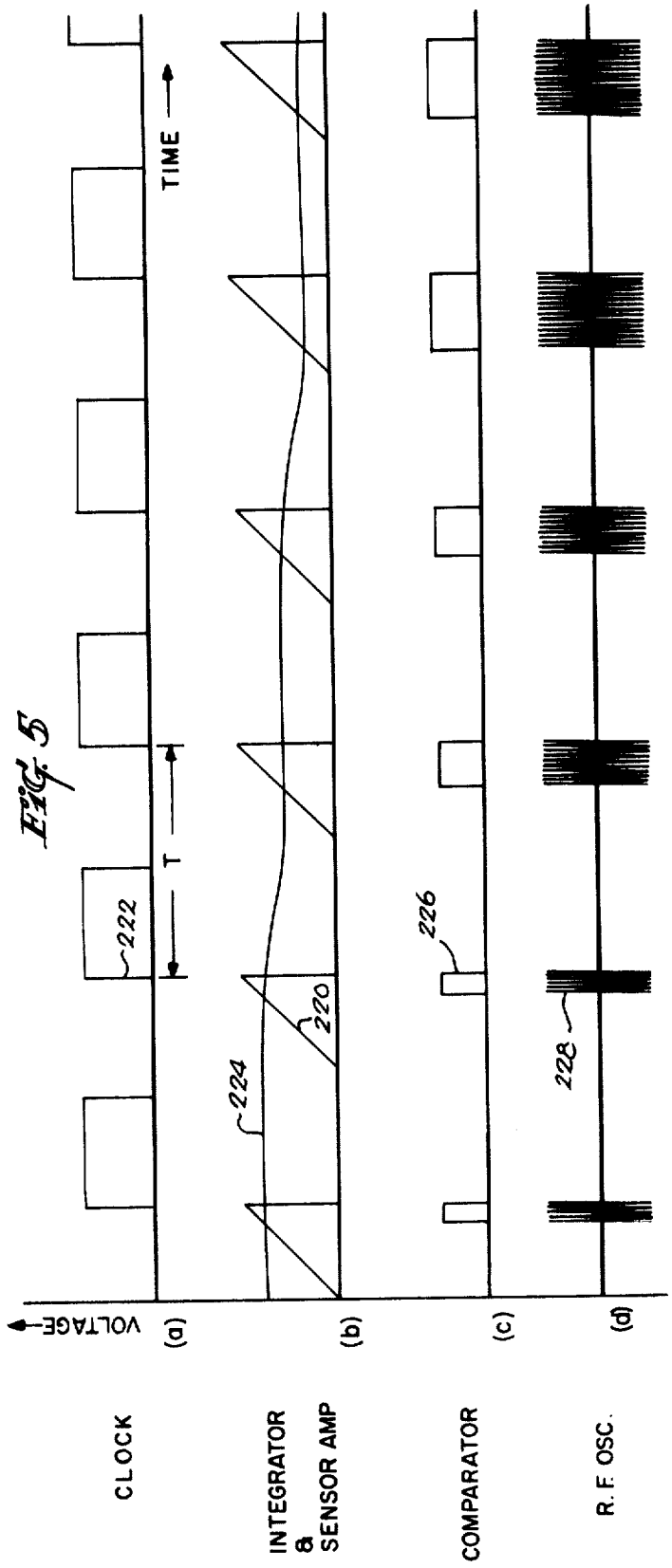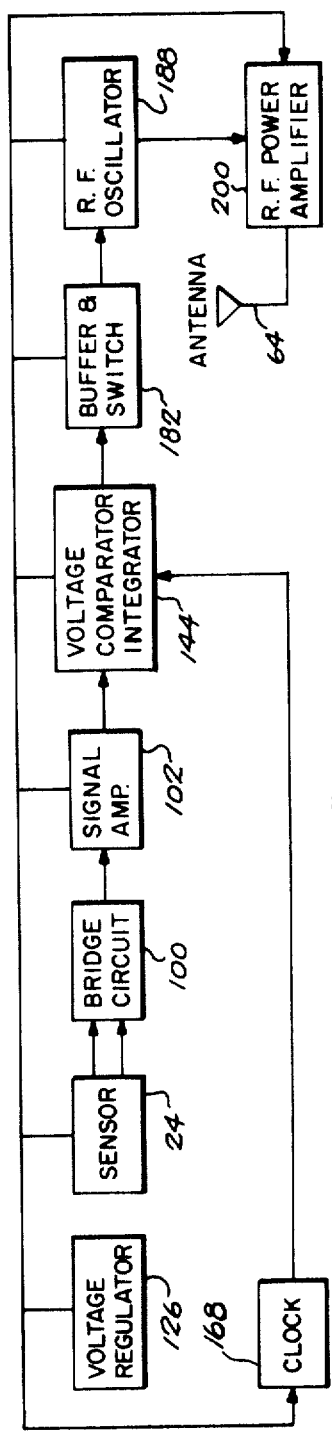

PORTABLE REMOTE LOCATION MEASURING SYSTEM UTILIZING PULSE WIDTH MODULATION

BACKGROUND OF THE INVENTION

1. Field of the Invention

This invention relates to a condition measuring system and more particularly relates to a portable system for use in an oven to generate and transmit temperature indicative signals utilizing pulse width modulation.

2. Description of the Prior Art

It is often necessary to determine the existence and magnitude of a condition at a remote location. This is particularly true, for example, in the maintenance of temperature conditions in glass production wherein glassware, such as containers, tubing, and the like, is formed at relatively high temperatures and is thereafter annealed or heat-treated.

It is well recognized that the range of temperatures for optimum annealing of glassware is relatively small and, as annealing time is decreased in the interest of manufacturing efficiency without sacrificing favorable physical and chemical properties of the glass product, temperature regulation becomes even more critical. Often, the temperature of glassware within the oven, known as a lehr, must be controlled within a tolerance of plus or minus 5° F. in order to achieve optimum annealing; hence, it is important that the glassware temperature be closely monitored as the ware travels through the annealing lehr or oven. In this manner, better regulation of the temperature in the oven can be achieved which results, of course, in better regulation of glassware temperatures.

While apparatus for temperature measurement within an oven or furnace, including optical or radiation pyrometers, electronic pyrometers and thermocouples, have heretofore been known and/or utilized, none of these devices have proved to be completely successful. A major problem with the optical pyrometer, which measures the intensity of radiation by an incandescent body, is that the hot gases contained in the medium about the body interfere with the readings. As is well known, temperature responsive electronic devices, such as thermistors, are not practical at the high temperatures encountered in the first stages of a glass annealing process.

While the thermocouple overcomes many of the disadvantages of other prior art devices, it has not proved to be completely successful due at least partially to bulkiness and a requirement for associated usage of unwieldly equipment, particularly where long oven usage was contemplated. More specifically, if the thermocouple is to travel with the ware riding on a belt through the annealing oven, wire conductors have heretofore been necessary in order to conduct the electrical signal from the thermocouple to a temperature meter or recorder outside the oven for prompt indication. Besides being cumbersome, the added effective resistance of the wires subjected to varying oven temperatures tended to introduce errors which often made the obtained readings so inaccurate as to be unreliable.

The present invention is an improvement over such temperature measurement systems of the prior art; yet, the invention permits the use of a relatively inexpensive sensor such as a calibrated platinum resistor in a bridge circuit for the measurement. Utilization of the platinum resistor eliminates the need to use cold junction compensation circuitry such as would normally be necessary with a thermocouple. The apparatus includes a portable transmitting unit which is impervious to contemplated adverse conditions to be encountered; also, the unit is small enough to travel through an annealing oven with the ware and requires no associated cumbersome equipment or connecting wires to generate a condition indicating signal and to transmit the same outside the oven for utilization.

The portable transmitting unit includes a transmitter responsive to the magnitude of the signal from a bridge-type transducer, such as a resistor having a characteristic resistance according to the temperature thereof utilized in the measurement of temperature, to produce and radiate pulse width modulated signals suitable for immediate conversion outside of the oven in order to accurately and dependably indicate the temperature sensed within the oven.

SUMMARY OF THE INVENTION

The invention enables accurate and dependable monitoring of a condition by a bridge-type transducer. It is particularly useful for measurement of extreme temperature conditions such as may be encountered in a glass annealing oven. Further, the invention enables accurate and dependable transmission of the temperature indication signal by use of pulse width modulation.

Thus, it is an object of the present invention to provide an improved portable sensing system for the indication of a condition existing at a remote location.

It is another object of this invention to provide an improved sensing unit for the measurement of a condition and for transmission of a signal indicative of the condition to a remote location.

It is a further object of the invention to provide a completely dry portable measuring apparatus which may be operated in a high temperature environment such as occasioned within an oven or furnace.

A further object of the invention is to provide a transmitting unit operative within a high temperature environment to produce and transmit pulse width modulated signals indicative of a condition such as temperature within the environment.

A further object of the present invention is to provide a portable temperature sensing system having a calibrated platinum resistor connected in a bridge circuit, the resistance of the resistor being calibrated as a function of temperature so as to enable a bridge output signal, proportional to the increment of temperature of the resistor from a predetermined temperature, to be produced and transmitted utilizing pulse width modulation.

These and other objects and advantages will be apparent to those skilled in the art from the following description of a preferred embodiment of the invention as shown in the accompanying drawings.

BRIEF DESCRIPTION OF THE DRAWINGS

FIG. 1 is a perspective view of the measuring apparatus of the invention shown on the belt of an annealing lehr to sense temperatures within said lehr;

FIG. 2 is a cross-sectional view of the container taken along the lines 2—2 of FIG. 1;

FIG. 3 is a block diagram illustrating the transmitting unit of the invention;

FIGS. 5(a) through (d) are illustrations of typical waveforms occuring at designated points in the apparatus.

DESCRIPTION OF THE PREFERRED EMBODIMENT

Figure 4:
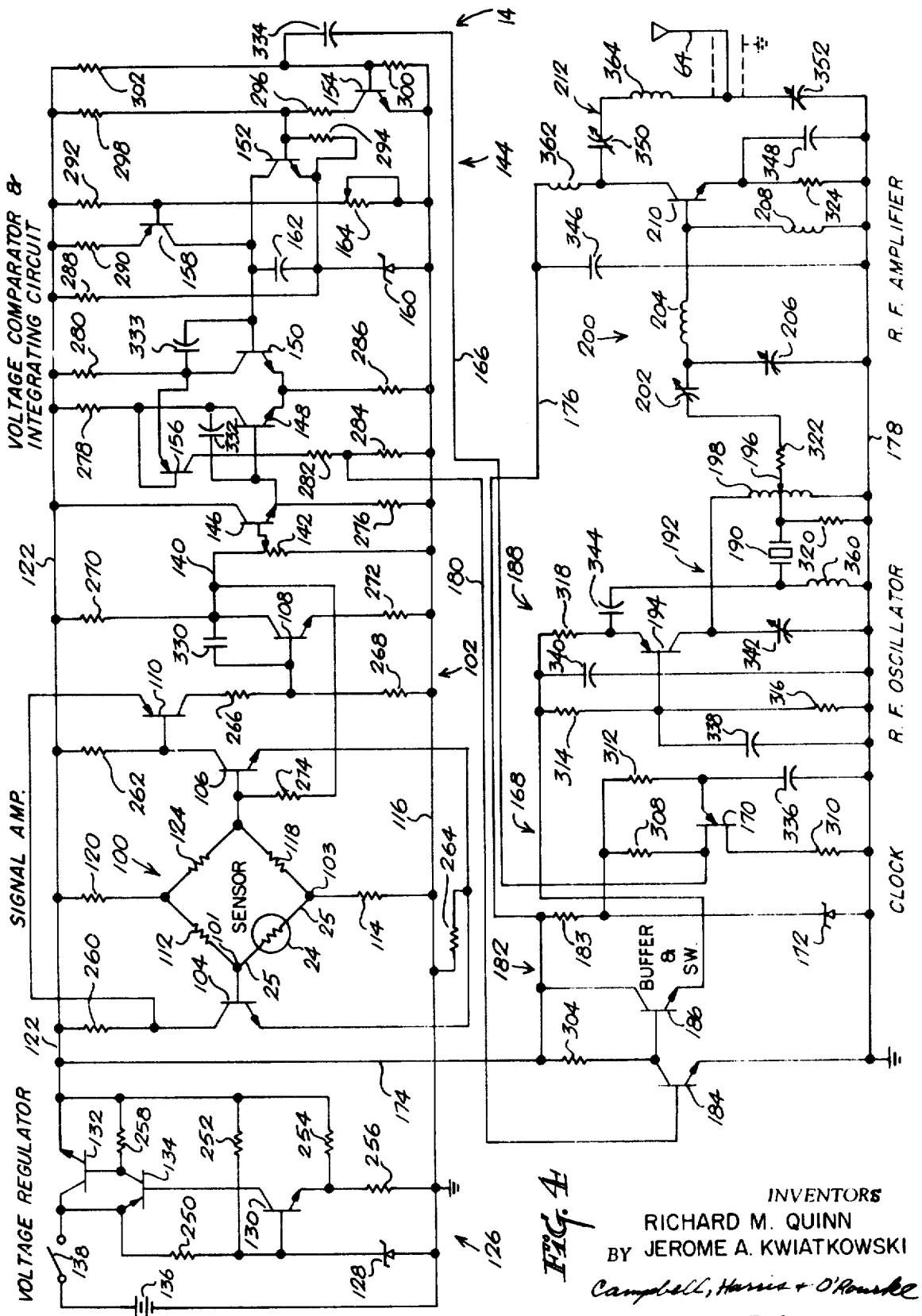
FIG. 4 is a schematic circuit diagram of the transmitting unit shown in FIG. 3.

Referring to FIG. 1, a preferred embodiment of the measurement apparatus 8 of the system for use in a high temperature environment is shown positioned to travel through an oven or furnace 10 on a conveyor belt 12 in the direction as indicated by the arrow. Measuring apparatus 8 includes a transmitting unit 14 (as shown in FIG. 2) positioned within an insulating container 15 of a material such as steel, for example, and is provided to generate a signal indicative of temperature, such as the temperature at the immediate environment of glass jars 16. Measuring apparatus 8 and jars 16 are positioned on the conveyor belt 12 so as to permit travel through the oven spaced from one another.

Measurement apparatus 8 includes, as shown best in FIG. 2, insulating container 15 having a base member shown in the drawings as a metal box-shaped can 20 and a metal cover member 22 of similar shape and adapted to tightly fit onto the can 20.

A temperature sensitive resistor 24, preferably of platinum for the temperature ranges expected to be encountered in a typical lehr, is suspended in the immediate environment of the jars 16 but may also be attached to the surface of a jar by any conventional means such as by a tape or by a suitable temperature-resistant bonding adhesive. Platinum resistor 24 is connected by wires 25 to the remainder of a bridge circuit within transmitting unit 14. A temperature indication signal is produced by the transmitting unit 14, as more fully hereinafter described with reference to FIGS. 3 through 5, and a pulse width modulated carrier signal is then transmitted by transmitter 14 to a convention receiver 26, preferably located outside the oven, which receiver includes a conventional demodulator and converter (not shown) for indicating the measured temperature. If desired, the measured temperature can be permanently recorded on a time-temperature recorder 28.

Although a platinum resistor for producing a signal corresponding to temperature is shown, it should be readily apparent that other transducers might be substituted to detect other conditions; for example, a strain gage to detect thermal expansion or contraction of an article such as one of the jars 16.

Referring particularly to FIG. 2, there is shown a cross-sectional view of the measurement apparatus 8. The can 20 is filled with a dry, preferably solid, insulating material 30, an insulating material of 50 lbs./cu. ft. density having been used to good effect. Such an insulating material is sold, for example, by Glass Rock Products, Inc. under the name "Glass Rock Foam."

Transmitter 14 is placed in a cavity 34 centrally located in and within insulation 30. Normally, transmitter 14 will be housed within a suitable receptacle 35, and, if desired, the cavity itself can be formed by walls (not shown) of suitable material, such as metal, as can the top of the base (as would usually be necessary if the insulation was a powder instead of solid).

Receptacle 35, housing the transmitter components, is closed by top 38 having a shoulder 39 terminating in a peripheral flange 40. Shoulder 39 extends downwardly from flange 40 and may have an O-ring 41 mounted thereon to seal the receptacle 35, if desired. The central portion of top 38 has three openings therein to receive electrically insulated terminals 44, 46, and 48, which terminals are connected with the electrical components within receptacle 35 as more fully hereinafter described with reference to FIGS. 3 and 4.

The cover member 22 has an outer cylindrical wall 49 slightly larger in diameter than can 20 so that the lower portion of wall 49 receives the upper portion of can 20 therebetween. Cover member 22 also houses dry insulating material 30, preferably identical to the insulating material in can 20. If desired, a cover (not shown) can be provided to completely enclose the insulation (as would be necessary if the insulation is a powder, for example. Cover member 22 is provided with longitudinally extending openings 54 and 55 each of which opens at one end to the external environment at the top of the cover member 22, and opens at the other end to the interior of can 20 at cavity 36. If desired, handles (not shown) can be provided to facilitate removal of cover 22 from can 20.

It is obvious that the general dimensions of the measurement apparatus 8, and more specifically the thickness of the layer of insulating material 30, and type of insulation utilized may be varied depending on contemplated usage to maintain suitable transmitter temperatures. For an embodiment as shown in FIG. 1, a 1-foot-square can with approximately 4 inches of insulation gives sufficient protection for a transmitter within a lehr for a period exceeding 15 minutes at a lehr temperature initially exceeding 1000° F. (considering herein that the temperature of transmitter unit 14 must be maintained below 110° F.).

The wires 25 leading from platinum resistor 24 in the environment of the glass jars 16 are inserted through the narrow opening 54, and connected to input terminals 44 and 48 of the transmitter. Further, an antenna 64 from the transmitter unit 14 is connected to terminal 46 and extends, in the assembled position of the measurement apparatus 8, through tube 55 and out of the cover member 22. Since the wave propogation distance out of the annealing oven 10 from the apparatus 8 is generally relatively short, suitable transmission may be effected, for example, by positioning a simple wire antenna outside the cover member 22.

Referring to FIG. 3, the electrical block diagram of the transmitting unit is illustrated; and in FIG. 4 the particular elements and electrical connections are shown in detail with the groups of elements constituting the general elements of FIG. 3 being similarly labeled. The sensor, or platinum resistor, 24 is connected by conductors 25, which lead to within the insulating container 15, so that resistor 24 forms one leg of a balanced bridge circuit 100, with conductor 25 being connected to bridge circuit 100 at junctions 101 and 103.

The bridge circuit 100 is connected to a differential signal amplifier 102 which includes NPN-type transistors 104, 106, 108 and PNP-type transistor 110. The sensor, or platinum resistor, 24 is connected at one end to the base of transistor 104 and to a resistor 112 of a second leg of the bridge 100. The opposite end of platinum resistor 24 is connected to a resistor 114 leading to a ground line 116 and to a resistor 118 of a third leg of the bridge. Resistor 112 is also connected to a resistor 120 leading to a line 122 and to one end of a resistor 124 in the fourth leg of the bridge 100. Resistor 118 is connected to the opposite end of resistor 124 and to the base of transistor 106.

Lines 122 and 116 lead from a voltage regulator 126 which includes a Zener diode 128, NPN-type transistors 130, 132 and PNP-type transistor 134. The regulator includes a direct current bias source 136, current from which is controlled through a switch 138 to operate the transmitter. Regulator 126 is provided in order to maintain a constant source of supply voltage to the transistors of the elements of the transmitter, which voltage remains substantially constant even though the voltage from the source 136 may be affected by temperature variations endured upon travel of transmitting unit 14 through the oven 10.

As hereinafter shown in a tabulation of values and element types as used in a typical constructed embodiment of the invention, resistors 112 and 124 have the same resistance. At a predetermined temperature, namely 1100° F. in the embodiment shown in the drawings, resistor 24 exhibits a resistance substantially equal to the resistance of resistor 118. Since the bridge is balanced, the output on a line 140 from the operational amplifier is effectively zero or nominal at this temperature.

Line 140 is connected to a potentiometer 142 leading to ground and having an adjusting arm connected to a voltage comparator and integrating circuit 144. Circuit 144 includes NPN-type transistors 146, 148, 150, 152 and 154 and PNP-type transistors 156 and 158. Upon a change in the resistance of platinum resistor 24 of the bridge circuit 100 being effected by a change in the sensed temperature, the bridge becomes unbalanced to produce an output voltage from the bridge, which voltage is amplified and coupled to circuit 144 on line 140, the produced voltage being proportional to the increment of temperature variation as sensed by the platinum resistor.

Upon conduction of the signal, or at a small predetermined threshold as adjusted at potentiometer 142, transistor 146 is rendered conductive and the output therefrom is conducted to the base of transistor 148. The comparator portion of circuit 144 includes transistors 148 and 150 so that when the signal at the base of transistor 148 exceeds the signal at the base of transistor 150, transistor 156 is rendered nonconductive and remains nonconductive for the duration of this condition as more fully hereinafter explained with reference to the waveforms shown in FIG. 5. The signal at the base of transistor 150 is produced from a steady state current through Zener diode 160 charging a capacitor 162 so that the signal conducted to transistor 150 is the integral of the steady state signal; namely, a ramp voltage. The slope of the ramp voltage may be adjusted by moving the adjusting arm of a potentiometer 164 connected between ground line 116 and the base of transistor 158.

At predetermined periods of time, pulse signals on a line 166 leading from a clock 168 cause transistor 152 to conduct and transistor 154 to cease conduction so as to permit the capacitor 162 to discharge. Therefore, the signal comparison is between the temperature indicative signal at the base of transistor 148 and a ramp signal at the base of transistor 150 until the signal from clock 168 causes discharge of the capacitor 162. Clock 168 includes a unijunction transistor 170 and a Zener diode 172. Supply voltage is supplied from regulator 126 between a line 174, leading from line 122, and another ground line 178, with line 176 leading to RF amplifier 200 to supply power thereto.

A line 180 connects buffer amplifier and switch 182, which includes a pair of NPN-type transistors 184 and 186, to voltage comparator and integrating circuit 144 to receive the output therefrom. The output signal from the buffer amplifier and switch 182 is taken from the emitter and coupled to RF oscillator 188.

RF oscillator 188 includes a crystal 190 of conventional type connected in a tank circuit 192 leading from a PNP-type transistor 194 and oscillates at its natural frequency for the duration of the signal from the buffer and switch 182. The oscillations are conducted on a line 196 from a tapped inductor 198 of the tank circuit 192 to a radio frequency amplifier 200. Spurious signal components are blocked by a variable capacitor 202 in series with an inductor 204 and filtered out by a variable capacitor 206 and a radio frequency choke 208. The signal oscillations, as amplified by a transistor 210, are conducted through a series resonant circuit 212 and radiated from the antenna 64.

Referring to the waveforms of FIG. 5, the periodic ramp voltage signal applied to the base of transistor 150 from the current through Zener diode 160 charging capacitor 162 is shown wherein the ramp signal 220, as particularly shown in FIG. 5(b), is terminated by the leading edge of each clock pulse 222, as particularly shown in FIG. 5(a), being conducted from clock 168 so as to cause conduction of transistor 152 and discharge of capacitor 162. The charging time period of the capacitor 162 is relatively long compared to the period between pulses. Therefore, the slope of ramp voltage signal 220, corresponding to the integral of the current through Zener diode 160, is linear whereas the signal is quickly discharged as indicated by the vertical slope in FIG. 5(b).

An illustrative temperature indicative signal 224 (see FIG. 5(b)) represents the signal from the bridge 100 as amplified by the differential amplifier 102 and conducted to the base of transistor 148. Upon the ramp signal 220 exceeding the temperature indicative signal 224, a signal is produced on line 180 causing the buffer and switch circuit 182 to operate and produce a square wave signal 226 as illustrated in FIG. 5(c). This signal lasts for the interval during which the ramp voltage exceeds the temperature indicative signal, as shown in FIG. 5(b), and is utilized to control operation of oscillator 188. As a result, radio frequency oscillations 228, as shown in FIG. 5(d), are produced by the oscillator for the duration of square waves 226, which signal oscillations, as filtered and amplified, are radiated from the antenna 64.

The waveform diagrams of FIG. 5 are shown broken away along the time axis to illustrate the operation for various and typical levels of the temperature indicative signal 224 produced as the measurement apparatus 8 travels through the oven 10. The scope of the signal 224 between successive levels thereof is purposely exaggerated for illustration, but in practice would be more gradual over the relatively short time interval of only the several clock periods shown.

Since the ramp voltage signal 220 is linear and periodic, the variable that controls the output pulse width of the radio frequency signal is the amplified signal from bridge circuit 100 (sensor 24 being a part of bridge 100) and is therefor a function of temperature. Since the pulse width of the radio frequency signals 228 becomes wider as temperature decreases (causing a decrease in the magnitude of signal 224), the transmitted pulse width of the radio frequency signal is inversely proportional to the oven temperature. The pulse modulated radio frequency signal is radiated from the antenna 64 extending through and out of the passageway 55 in cover 22 of the insulating container 15.

The operating frequency of the transmitter of this invention may be varied as desired depending upon each particular case and bearing in mind that the lehr can act as a waveguide at some frequencies. A frequency in the FM broadcast range, however, has been used to good advantage, and the particular embodiment illustrated herein operates at about 98 MHz.

The power of supply voltage source 136 for the transmitting unit 14 is supplied from batteries which are also mounted (not shown) within receptacle 35 and are of a type such as those known as "mercury batteries" which have been found suitable for operation at temperatures well above 110° F. Further, silicon-type semiconductors were utilized in the transmitter for operation at such temperatures.

The transmitter of this invention is preferably small in size so that when inserted within an insulated can, the overall size of the unit is small enough so as to avoid upsetting the temperature distribution of a lehr. In addition, the unit is preferably light in weight so as to be easily utilized in practice.

For purposes of example, the following is a list of components that can be utilized to good advantage in the transmitter unit of this invention: Resistors= 24–318 (at 1100° F.); 112–698; 114–562; 118–318; 120–562; 124–698; 142–0–10 K; 164–0–10 K; 183–2.7 K; 250–100 K; 252–10 K; 254–20 K; 256–10 K; 258–5.6 K; 260–1 K; 262–1 K; 264–1960; 266–15 K; 268–40.2 K; 270–10 K; 272–100; 274–100 K; 276–4.7 K; 278–3.9 K; 280–3.9 K; 282–15 K; 284–10 K; 286–4.7 K; 288–10 K; 290–3.3 K; 292–3.9 K; 294–4.7 K; 296–4.7 K; 298–15 K; 300–10 K; 302–22 K; 304–15 K; 308–1 K; 310–68; 312–3830; 314–470; 316–470; 318–100; 320–470; 322–330; 324–1.35; Capacitors=162–33 ($10^{18}$); 202–7 thru 100 ($10^{112}$) variable; 206–7 thru 100 ($10^{112}$) variable; 330–10$^{18}$; 332–10$^{18}$; 333–10$^{18}$; 334–15 ($10^{18}$); 336–22 ($10^{18}$); 338–500 ($10^{12}$); 340–500 ($10^{112}$); 344–200 ($10^{112}$); 346–5 ($10^{19}$); 348–330 ($10^{112}$); 350–4 thru 40 ($10^{112}$) variable; 352–4 thru 40 ($10^{112}$) variable; Inductors=204–3 turns of 016 wire, ¼inches I.D., 5/16 inches long; 208–R. F. Choke; 362–R. F. Choke; 364–5 turns of 016 wire, 5/16 inches I.D., 7/16 inches long; Diodes=128–1N825; 160–1N825; 172–1N825; and Transistors =104–½(2N2640); 106–½(2N2680); 108–2N1711; 110–2N1132; 130–2N1711; 132–2N1711; 1.34–2NN32 146–2N1711; 148–2N1711; 150–2N1711; 152–2N1711; 154–2N1711; 156–2N1132; 158–2N1132; 170–2N2647; 184–2N1711; 186–2N1711; 194–2N2996; 210–2N3553. The components listed herein are meant to be illustrative only, and accordingly the invention is not meant to be limited thereto.

Although only one embodiment of the invention has been illustrated and described, it is anticipated that various changes and modifications will be apparent to those skilled in the art, and that such may be made without departing from the scope of the invention as defined by the following claims.

1. A system for monitoring a condition within an oven, the condition existing within the oven at a location remote from the monitoring location, said system comprising:
bridge circuit means including a resistance element within the oven having a variable effective resistance, the value of which is controlled by the condition sensed so that said bridge circuit means produces an output signal indicative of the condition sensed; transmitting means including pulse width modulation means responsive to said output signal from said bridge circuit means for producing pulsed signals the width of each of which is indicative of said condition sensed, said transmitting means transmitting a pulse width modulated electromagnetic energy signal carrying sensed condition intelligence; and receiving means for receiving the transmitted signal and deriving said sensed condition intelligence therefrom to indicate the condition sensed within the oven.

2. The system as defined in claim 1 wherein the resistance element includes: a platinum resistor having a predetermined characteristic such that resistance varies as a function of temperature; whereby said receiving means indicates the temperature then existing within the oven as sensed by said platinum resistor.

3. The system as defined in claim 1 wherein the pulse width modulating means includes: means for producing a ramp signal of predetermined duration and period of repetition; comparator means for receiving said ramp signal and said signal from said bridge circuit means, said comparator means producing an output signal when said ramp signal exceeds the magnitude of the signal from the bridge circuit means; and oscillating means connected to said comparator means so as to produce an oscillatory signal substantially equal in duration to the output signal from said comparator means; whereby the duration of the oscillatory signal corresponds to the condition sensed within the oven.

4. A system for remotely monitoring the temperature within an oven, said system comprising: a bridge circuit including a sensing resistor within an oven, said resistor having a resistance dependent upon the temperature within said oven and connected so that the output signal from said bridge circuit is temperature dependent; an oscillator; signal processing means responsive to the output signal from said bridge circuit to produce a pulsating modulation signal for controlling said oscillator, the width of each pulse of said pulsating signal being dependent upon the temperature within said oven; means for transmitting said pulsating modulated signal; and means for receiving said pulse width modulated signal and indicating the temperature within said oven therefrom.

5. A system for monitoring a temperature condition within an oven, the temperature condition existing within the oven at a location remote from the monitoring location, the system comprising: transducing means for producing a signal indicative of the temperature condition sensed within the oven; converting means for producing output pulses the duration of each of which is controlled by said signal from said transducing means, said duration being indicative of said sensed temperature condition; an oscillator for producing a radio frequency carrier signal pulse width modulated by the output pulses from said converting means; an antenna for radiating the modulated carrier signal from within the oven; and means for receiving the radiated signal and producing therefrom an indication of the sensed temperature condition.

6. The system of claim 5 wherein the frequency of said oscillator carrier signal is within the FM broadcast band.

7. A condition sensing and transmitting unit for indicating predetermined conditions within an oven, said unit comprising: transducer means for producing a signal the magnitude of which is indicative of a predetermined condition within said oven; converting means responsive to the signal from said transducer means for producing output pulses the width of each of which is indicative of said predetermined condition; oscillator means for producing a radio frequency carrier signal that is pulse width modulated by the output pluses from said converting means; and means for transmitting said modulated signal produced by said oscillator means.

8. The unit of claim 7 wherein said transducer means is temperature sensitive so that said condition sensed is the temperature within said oven.

9. The unit of claim 8 wherein-said transducer means is a bridge circuit which includes a platinum resistor that is exposed to oven temperatures, the resistance of said platinum resistor being dependent upon temperatures encountered.

10. The unit of claim 7 wherein said converting means includes means for producing a ramp voltage of predetermined slope; and comparator means for receiving said ramp voltage and said signal from said transducer means for determining the width of each of said output pulses produced by said converting means.

11. The unit of claim 10 wherein said converting means includes switch means connected to receive the output pulses from said comparator means, and clock means connected with said comparator means and said switch means for controlling timing of said produced output pulses.

12. The unit of claim 7 wherein said oscillator means is a crystal controlled radio frequency oscillator the operation of which is controlled by said output pluses from said converting means.

13. A temperature sensing and transmitting unit for indicating temperature conditions within an oven, said unit comprising: a bridge circuit having a sensing resistor exposed to the temperature within an oven, said bridge circuit producing an output signal the magnitude of which is dependent upon said sensed temperature; signal generating means for producing a ramp voltage of predetermined slope; comparator means for receiving said ramp voltage and said output signal from said bridge circuit and producing a plurality of output pulses the width of each of which is controlled by comparison of the input signals to said comparator means; switching means connected to receive said pulse output from said comparator means; clock means connected with said switching means and said comparator means for timing said produced output pulses; an RF oscillator connected with said switching means and operatively controlled by said output pulses therefrom so that a pulse width modulated output signal is produced by said oscillating means; and means for transmitting said pulse width modulated signal.

14. A system for monitoring an environmental condition at successive locations within an oven having conveying means for conveying articles therethrough, the successive locations being remote from the monitoring location, the system comprising: transducing means for producing an output signal indicative of the condition; means for producing ramp signals of predetermined duration; comparator means for receiving said ramp signal and said output signal from said transducing means and producing a plurality of output pulses the width of each of which is indicative of said condition; oscillating means responsive to each of said output pulses from said comparator means so as to produce an oscillatory signal corresponding to the duration of said pulse; an antenna to radiate the oscillatory signal from said oscillating means; a portable insulated container adapted to receive said oscillating means, comparator means, ramp signal producing means, and at least a portion of said transducing means, said container being adapted to be conveyed through said oven by said conveyor means; and means for receiving the oscillatory signal radiated from said antenna and deriving said sensed condition therefrom.

15. The system as defined in claim 14 wherein said transducing means includes: bridge circuit means including a resistance element having a predetermined characteristic of resistance in accordance with the temperature thereof, said resistance element being externally positioned with respect to said container with the remainder of said bridge circuit being within said container; whereby the duration of the oscillatory signal received corresponds to the temperature of said resistance element at the successive locations within the oven.

16. The system as defined in claim 15 wherein said portable insulated container has at least two passageways extending from within and through said container so that at least a portion of said antenna and said resistance element are connected with said circuitry within said container by separate and spaced connecting means.

75